United States Patent
Mangum et al.

(10) Patent No.: US 10,960,914 B2
(45) Date of Patent: Mar. 30, 2021

(54) SNOW BIKE AND A FRONT SUSPENSION FOR A SNOW BIKE

(71) Applicant: Polaris Industries Inc., Medina, MN (US)

(72) Inventors: Allen M. Mangum, Sandpoint, ID (US); Cody L. Telford, Sandpoint, ID (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/733,883

(22) Filed: Jan. 3, 2020

(65) Prior Publication Data
US 2020/0140000 A1 May 7, 2020

Related U.S. Application Data

(63) Continuation of application No. 15/975,048, filed on May 9, 2018, now Pat. No. 10,538,262, which is a continuation of application No. 15/441,368, filed on Feb. 24, 2017, now Pat. No. 9,988,067.

(51) Int. Cl.
*B62K 13/00* (2006.01)
*B62B 17/04* (2006.01)

(52) U.S. Cl.
CPC .................. *B62B 17/04* (2013.01)

(58) Field of Classification Search
CPC .... B62K 13/00; B62K 2700/50; B62K 21/00; B62M 2027/021; B62M 2027/022; B62M 2027/026; B62B 17/04
See application file for complete search history.

(56) References Cited

U.S. PATENT DOCUMENTS

| | | |
|---|---|---|
| 3,336,994 A | 8/1967 | Pederson |
| 3,527,505 A | 9/1970 | Hetteen |
| 3,545,821 A | 12/1970 | Erickson |

(Continued)

FOREIGN PATENT DOCUMENTS

| | | |
|---|---|---|
| AT | 242150 | 6/2003 |
| CA | 2321860 | 9/1999 |

(Continued)

OTHER PUBLICATIONS

Technical Preview, SnowTech, Crazy Mountain Xtreme Bike Kit, Sep. 2015; 3 pages.

(Continued)

*Primary Examiner* — Bryan A Evans
(74) *Attorney, Agent, or Firm* — Faegre Drinker Biddle & Reath LLP

(57) ABSTRACT

A front fork assembly of a snow bike is disclosed having left and right legs, each having an upper leg portion and a lower leg portion. The left leg upper and lower leg portions are linearly movable relative to each other. A right leg has an upper leg portion and a lower leg portion, the right leg upper and lower leg portions are linearly movable relative to each other. A ski mount has a lower end for coupling to a ski and an upper end for coupling to the left and right leg. A linear force element is coupled to the left and right legs with a first end adjacent the first ends of the forks and seconds ends coupled to the ski, the linear force element has a different linear force characteristic than the left and right legs.

26 Claims, 13 Drawing Sheets

(56) References Cited

U.S. PATENT DOCUMENTS

| | | | |
|---|---|---|---|
| 3,630,301 A | 12/1971 | Henricks | |
| 3,705,749 A | 12/1972 | Harvey | |
| 3,718,341 A | 2/1973 | Westberg | |
| 3,719,369 A | 3/1973 | Savage | |
| 3,779,326 A | 12/1973 | Trautwein | |
| 3,809,172 A | 5/1974 | Hendrickson | |
| 3,822,755 A | 7/1974 | Hine | |
| 3,844,367 A | 10/1974 | Flohr | |
| 3,857,578 A | 12/1974 | Alton | |
| 3,872,938 A | 3/1975 | DeGroot | |
| RE28,423 E | 5/1975 | Higginbotham | |
| 3,931,861 A | 1/1976 | Olson | |
| 3,964,561 A | 6/1976 | Lunzer | |
| 3,977,485 A | 8/1976 | West | |
| 3,982,597 A | 9/1976 | Callaway | |
| 4,034,820 A | 7/1977 | Barnhardt | |
| 4,108,453 A | 8/1978 | Lavalier | |
| 4,131,292 A | 12/1978 | Swech | |
| 4,133,400 A | 1/1979 | Shiraishi | |
| 4,244,436 A | 1/1981 | Condon | |
| 4,424,979 A | 1/1984 | Takagi | |
| 4,434,867 A | 3/1984 | Grinde | |
| 4,437,534 A | 3/1984 | Grinde | |
| 4,442,913 A | 4/1984 | Grinde | |
| 4,449,602 A | 5/1984 | Dittmann, Jr. | |
| 4,502,560 A | 3/1985 | Hisatomi | |
| 4,509,766 A | 4/1985 | Yasui | |
| 4,526,249 A | 7/1985 | Parker | |
| 4,613,006 A * | 9/1986 | Moss | B62K 13/00 180/184 |
| 4,768,794 A * | 9/1988 | Bibollet | B62K 21/00 180/190 |
| 4,804,198 A | 2/1989 | Imai | |
| 4,984,648 A | 1/1991 | Strzok | |
| 5,064,208 A | 11/1991 | Bibollet | |
| 5,145,195 A | 9/1992 | Campbell | |
| 5,145,201 A | 9/1992 | Metheny | |
| 5,203,424 A | 4/1993 | Gogo | |
| 5,370,198 A | 12/1994 | Karpik | |
| 5,474,146 A * | 12/1995 | Yoshioka | B62K 13/00 180/184 |
| 5,586,614 A | 12/1996 | Kouchi | |
| 5,727,643 A | 3/1998 | Kawano | |
| 5,871,225 A | 2/1999 | Sutherland | |
| 5,904,217 A | 5/1999 | Yamamoto | |
| 6,012,728 A | 1/2000 | Noble | |
| 6,017,047 A | 1/2000 | Hoose | |
| 6,095,275 A | 8/2000 | Shaw | |
| 6,105,979 A | 8/2000 | Desrochers | |
| 6,112,840 A | 9/2000 | Forbes | |
| 6,234,263 B1 | 5/2001 | Boivin | |
| 6,283,254 B1 | 9/2001 | Bibollet | |
| 6,302,232 B1 | 10/2001 | Forbes | |
| 6,321,864 B1 | 11/2001 | Forbes | |
| 6,382,338 B1 | 5/2002 | Forbes | |
| 6,416,062 B1 | 7/2002 | Scatchard | |
| 6,431,301 B1 | 8/2002 | Forbes | |
| 6,446,744 B2 | 9/2002 | Wubbolts | |
| 6,505,896 B1 | 1/2003 | Boivin | |
| 6,511,079 B1 | 1/2003 | Charles, Sr. | |
| 6,626,258 B1 | 9/2003 | Forbes | |
| 6,626,441 B1 | 9/2003 | Hanson | |
| 6,631,912 B2 | 10/2003 | Metheny | |
| 6,663,117 B2 | 12/2003 | Cheney | |
| 6,736,414 B2 | 5/2004 | Farrally-Plourde | |
| 6,783,133 B1 | 8/2004 | Araujo | |
| 6,863,142 B2 | 3/2005 | Corbeil | |
| 6,926,108 B1 | 8/2005 | Polakowski | |
| 7,017,695 B2 | 3/2006 | Meunier | |
| 7,090,229 B2 | 8/2006 | Monsrud | |
| 7,182,165 B1 * | 2/2007 | Keinath | B62M 27/02 180/185 |
| 7,232,130 B2 | 6/2007 | Reeves | |
| 7,322,581 B2 | 1/2008 | Leung | |
| 7,353,898 B1 | 4/2008 | Bates, Jr. | |
| 7,357,201 B2 | 4/2008 | Jordan | |
| 7,475,751 B2 | 1/2009 | Pard | |
| 7,478,694 B2 | 1/2009 | Abe | |
| 7,481,437 B2 | 1/2009 | Musselman | |
| 7,500,679 B2 | 3/2009 | Wade | |
| 7,533,749 B1 | 5/2009 | Sampson | |
| 7,537,221 B2 | 5/2009 | Lasala | |
| 7,540,506 B2 | 6/2009 | Cheney | |
| 7,594,557 B2 | 9/2009 | Polakowski | |
| D612,766 S | 3/2010 | Boivin | |
| 7,694,768 B2 | 4/2010 | Giese | |
| 7,726,667 B2 | 6/2010 | Ferron | |
| 7,745,751 B2 | 6/2010 | Takahashi | |
| 7,789,183 B2 | 9/2010 | Sadakuni | |
| 7,896,362 B1 | 3/2011 | Scatchard | |
| 8,167,073 B2 | 5/2012 | Polakowski | |
| 8,403,342 B1 | 3/2013 | McDaniel | |
| 8,418,792 B2 | 4/2013 | Rivard | |
| 8,739,913 B2 | 6/2014 | Rivard | |
| 8,910,738 B2 | 12/2014 | Mangum | |
| 9,731,746 B2 | 8/2017 | Hodgson | |
| 9,751,552 B2 * | 9/2017 | Mangum | B62B 17/04 |
| 9,776,654 B2 | 10/2017 | Gentry | |
| 9,873,485 B2 | 1/2018 | Mangum | |
| 9,988,067 B1 | 6/2018 | Mangum | |
| 10,202,169 B2 | 2/2019 | Mangum | |
| 10,232,910 B2 | 3/2019 | Mangum | |
| 10,479,448 B2 | 11/2019 | Tapio | |
| 10,538,262 B2 | 1/2020 | Mangum | |
| 2002/0017765 A1 | 2/2002 | Mallette | |
| 2002/0041080 A1 | 4/2002 | Moriyama | |
| 2002/0153186 A1 | 10/2002 | Lemieux | |
| 2002/0158441 A1 | 10/2002 | Essinger | |
| 2003/0024751 A1 | 2/2003 | Lebreux | |
| 2003/0159868 A1 | 8/2003 | Alexander | |
| 2004/0089193 A1 | 5/2004 | O'Donnell | |
| 2004/0124596 A1 | 7/2004 | Cheney | |
| 2004/0163857 A1 | 8/2004 | Corbeil | |
| 2004/0195024 A1 | 10/2004 | Takahiko | |
| 2005/0017465 A1 | 1/2005 | Bergstrom | |
| 2006/0232028 A1 | 10/2006 | Pard | |
| 2008/0017431 A1 | 1/2008 | Sadakuni | |
| 2008/0029324 A1 | 2/2008 | Plankenhorn | |
| 2009/0230641 A1 | 9/2009 | Eugenio | |
| 2009/0321167 A1 | 12/2009 | Simmons | |
| 2011/0253468 A1 | 10/2011 | Rivard | |
| 2011/0266077 A1 | 11/2011 | Nadeua | |
| 2012/0205173 A1 | 8/2012 | Mallette | |
| 2012/0222908 A1 | 9/2012 | Mangum | |
| 2012/0247852 A1 | 10/2012 | Fecteau | |
| 2013/0032417 A1 | 2/2013 | Sampson | |
| 2013/0221628 A1 | 8/2013 | Rivard | |
| 2013/0313794 A1 | 11/2013 | Bach | |
| 2014/0035255 A1 | 2/2014 | Erickson | |
| 2015/0144412 A1 | 5/2015 | Mangum | |
| 2015/0251727 A1 | 9/2015 | Thibault | |
| 2015/0259032 A1 | 9/2015 | Mangum | |
| 2016/0031471 A1 | 2/2016 | Anderson | |
| 2016/0167722 A1 | 6/2016 | Anderson | |
| 2016/0280331 A1 | 9/2016 | Mangum | |
| 2017/0066502 A1 | 3/2017 | Will | |
| 2017/0129570 A1 | 5/2017 | Mangum | |
| 2017/0259877 A1 | 9/2017 | Thompson | |
| 2018/0251168 A1 | 9/2018 | Mangum | |
| 2018/0257690 A1 | 9/2018 | Mangum | |
| 2018/0273142 A1 | 9/2018 | Mangum | |
| 2019/0084643 A1 | 3/2019 | Thompson | |
| 2019/0168844 A1 | 6/2019 | Mangum | |

FOREIGN PATENT DOCUMENTS

| | | |
|---|---|---|
| CA | 2555039 | 9/1999 |
| CA | 2555108 | 9/1999 |
| CA | 2561337 | 9/1999 |
| CA | 2345490 | 10/2001 |
| CA | 2811026 | 3/2012 |
| CA | 2885569 | 9/2015 |
| CA | 2887975 | 9/2016 |
| CA | 2995818 | 8/2018 |

(56) References Cited

FOREIGN PATENT DOCUMENTS

| CA | 2996760 | 9/2018 |
|----|---------|--------|
| CA | 2998616 | 9/2018 |
| DE | 69908558 | 4/2004 |
| DE | 69922609 | 12/2005 |
| DE | 202006017459 | 6/2007 |
| EP | 0391282 | 10/1990 |
| EP | 1056639 | 12/2000 |
| EP | 0994016 | 12/2004 |
| JP | 61-222877 | 10/1986 |
| JP | 2001-153168 | 6/2001 |
| WO | 99/43540 | 9/1999 |
| WO | 2017/079503 | 5/2017 |

OTHER PUBLICATIONS

SnoWest Snowmobile Forum, View Single Post-380 mountain mini, Jan. 11, 2017, available at http://snowest.com/forum/showpost.php?p=4009975&postcount=61; 4 pages.

Office Action issued by the Canadian Intellectual Property Office, dated Dec. 14, 2018, for Canadian Patent Application No. 2,996,760; 3 pages.

International Search Report and Written Opinion of the International Searching Authority, dated Apr. 18, 2017, for International Patent Application No. PCT/US2016/060441; 24 pages.

International Preliminary Report on Patentability issued by the European Patent Office, dated Jan. 26, 2018, for International Patent Application No. PCT/US2016/060441; 27 pages.

Examination Report issued by the Canadian Patent Office, dated Dec. 13, 2018, for Canadian Patent Application No. 2,998,616; 3 pages.

Office Action issued by the Canadian Intellectual Property Office, dated Oct. 4, 2019, for Canadian Patent Application No. 2,998,616; 5 pages.

Office Action issued by the Canadian Intellectual Property Office, dated Aug. 27, 2019, for Canadian Patent Application No. 2,996,760; 3 pages.

Office Action issued by the Canadian Intellectual Property, dated Apr. 10, 2019, for Canadian Patent Application No. 3,003,473; 4 pages.

Examination Search Report issued by the Canadian Patent Office, dated Dec. 14, 2018, for Canadian Patent Application No. 2,996,760; 3 pages.

"All Skis are not created equal", <http://amsnow.com/how-to-tech/2005/09/all-skills-are-not-created-equal>, Nov. 2005; 3 pages.

\* cited by examiner

SNOW BIKE AND A FRONT SUSPENSION FOR A SNOW BIKE

RELATED CASES

The present application is a continuation of U.S. patent application Ser. No. 15/975,048, filed on May 9, 2018, and entitled "SNOW BIKE AND A FRONT SUSPENSION FOR A SNOW BIKE," which is a continuation of and claims priority from U.S. patent application Ser. No. 15/441,368, filed Feb. 24, 2017, and entitled "SNOW BIKE AND A FRONT SUSPENSION FOR A SNOW BIKE," the subject matter of which is incorporated herein by reference.

BACKGROUND

The present disclosure relates to a snow bike and in particular to a front suspension for a snow bike.

Snow bikes are known in the snowmobile art. These vehicles are usually converted for winter use by converting a dirt bike into a snow bike, by replacing the front tire with a ski and the rear wheel with a rear suspension and track. Such snow bikes are known from our US patents and patent applications, namely: U.S. Pat. No. 8,910,738; Publications 2012/0222908; 2015/0144412; 2015/0259032; 2016/0280331 and application Ser. No. 14/935,224; Ser. No. 14/935,265 and Ser. No. 15/165,862; the subject matter of which are incorporated herein by reference.

SUMMARY

In one embodiment of the invention, a front fork assembly of a snow bike comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; and a linear force element coupled to the left and right legs with a first end adjacent the first ends of the forks and seconds ends coupled to the ski, the linear force element having different linear force characteristic than the left and right legs.

In another embodiment, a front fork assembly of a snow bike comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; and a linear force element coupled to the left and right legs with a first end adjacent the first ends of the forks and seconds ends coupled to the ski, wherein the linear force element is an air shock.

In yet another embodiment, a snow bike comprises a frame; a powertrain supported by the frame; a rear suspension; a drive supported by the rear suspension and coupled to the drivetrain and a front suspension. The front suspension comprises a left leg having an upper leg portion and a lower leg portion, the left leg upper and lower leg portions being linearly movable relative to each other; a right leg having an upper leg portion and a lower leg portion, the right leg upper and lower leg portions being linearly movable relative to each other; a ski mount having a lower end for coupling to a ski and an upper end for coupling to the left and right leg; a linear force element coupled to the left and right legs with a first end adjacent the first ends of the forks and seconds ends coupled to the ski, the linear force element having different linear force characteristic than the left and right legs; and a front ski coupled to the front suspension.

BRIEF DESCRIPTION OF THE DRAWINGS

The embodiments will now be described by way of reference to the drawing figures, where.

DETAILED DESCRIPTION

Figure 1:
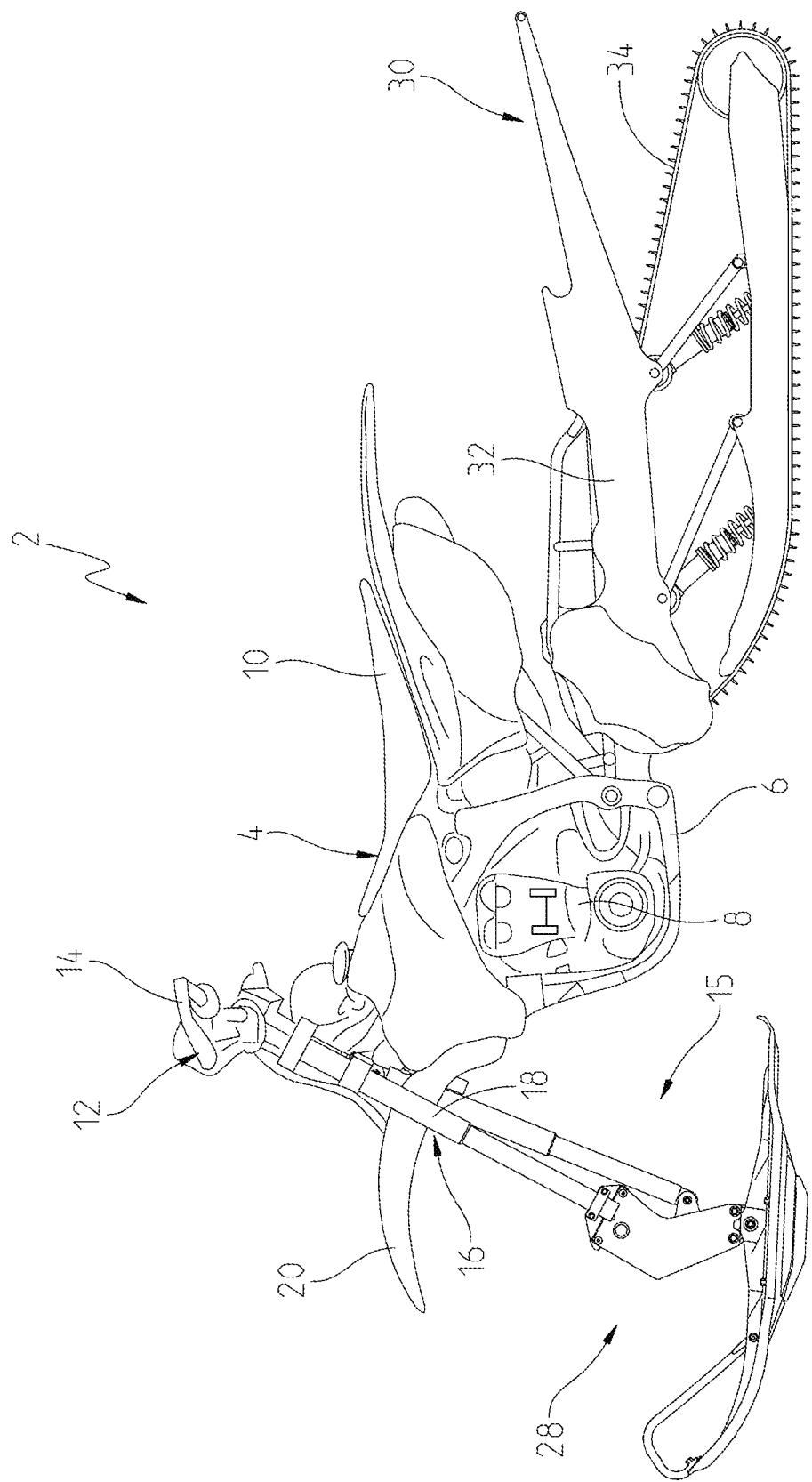
FIG. 1 is a left side view of the snow bike and front suspension of the present disclosure.

With reference first to FIG. 1, a snow bike is shown generally at 2. Snow bike 2 includes a dirt bike 4 having the front and rear wheels removed. Snow bike 2 includes a frame 6, a powertrain 8, a seat 10, steering assembly 12 including handlebars 14, and a front suspension 15. Front suspension is in part defined by the existing front fork assembly having forks 18, designated as left front fork 18L and right front fork 18R. A front fender 20 is positioned between the front forks 18. As shown, front wheel is removed and replaced with a front ski mount 28 which couple to the forks 18 as discussed herein. The rear wheel is removed and includes a rear suspension 30, including a tunnel 32 and a track 34. Rear suspension 30 could be similar to any of the rear suspensions shown in our US patents and applications, namely: U.S. Pat. No. 8,910,738; Publications 2012/0222908; 2015/0144412; 2015/0259032; 2016/0280331 and application Ser. No. 14/935,224; Ser. No. 14/935,265 and Ser. No. 15/165,862; the subject matter of which are incorporated herein by reference.

Figure 2:
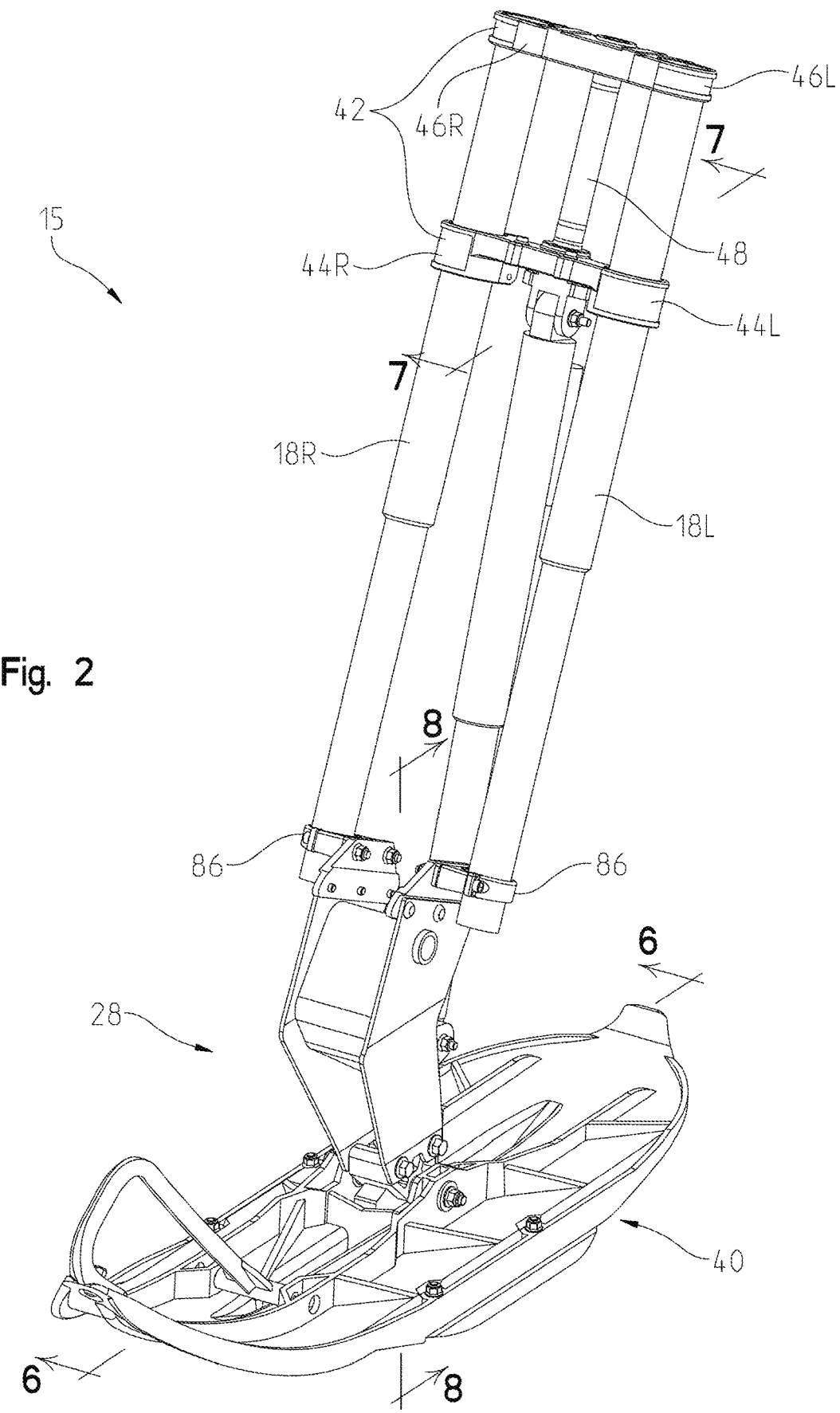
FIG. 2 is a front left perspective view of the front suspension shown in FIG. 1.
Figure 3:
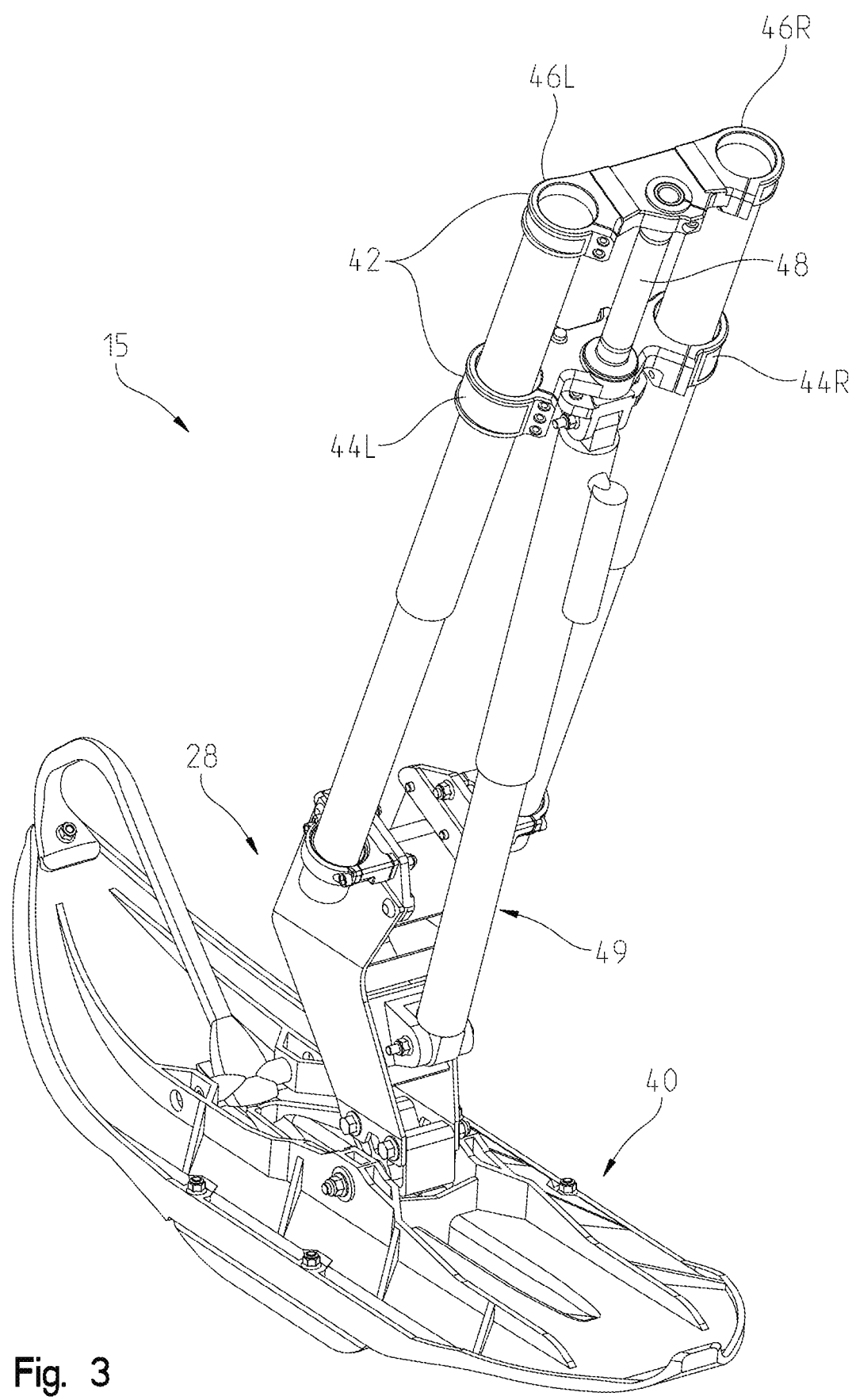
FIG. 3 is a left rear view of the front suspension shown in FIG. 2.
Figure 4:
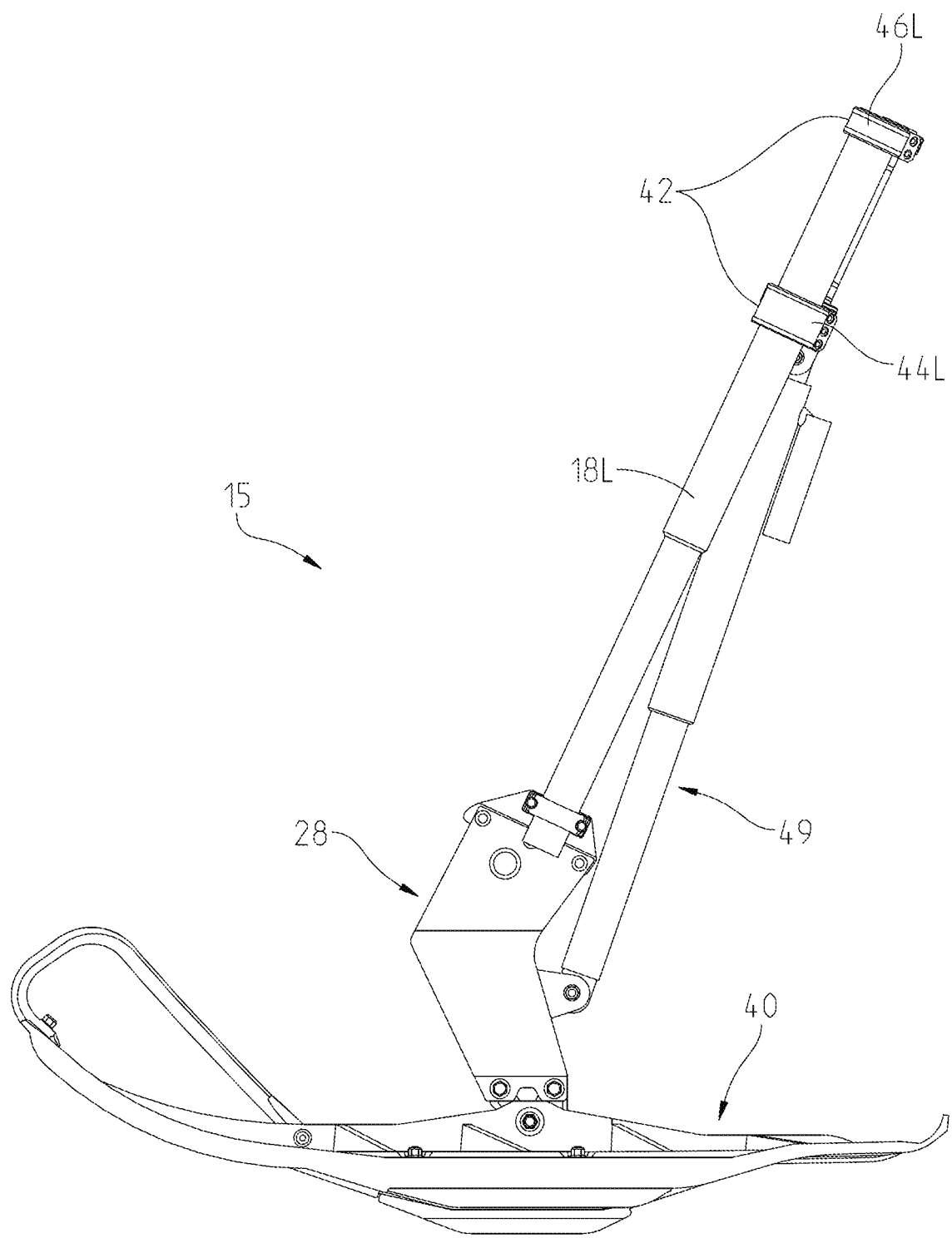
FIG. 4 is a left side view of the suspension of FIG. 2.

With reference now to FIGS. 2-4, front suspension 15 is shown comprising the forks or legs 18L and 18R which are coupled to ski mount 28, which in turn is coupled to front ski 40. It should be understood that left leg 18L and right leg 18R are coupled to the frame 6 of the snow bike by way of a triple clamp 42 having a lower left clamp portion 44L and a lower right hand clamp portion 44R; and an upper left clamp portion 46L and an upper right clamp portion 46R. These clamp portions clamp to associated legs 18L and 18R as is known in the art. Triple clamp 42 also includes a center pin 48 which may couple to a down tube (not shown) of the frame 6, such that legs 18L and 18R may rotate about pin 48 for steering. As shown in FIGS. 2-4, lower ends of the legs 18L and 18R are coupled to the ski mount 28 in order to turn the ski 40 for purposes of steering. As also shown, front suspension 15 further includes a linear force element 49 which is coupled between a bottom of triple clamp 42 and a top of the ski mount 28, as further described herein.

With reference now to FIGS. 5-8, the ski mount 28 will be described in greater detail. With reference first to FIG. 5A, ski mount 28 includes a spindle 50 having spaced apart plate portions 52. The plate portions 52 are spaced apart by way of a box-shaped inner plate 54 and a pin 56. A bracket 60 has a base portion 62 coupled between plates 52 and includes a clevis 64 having apertures at 66. Upper ends of plates 52 include apertures at 70 and lower ends of plate 52 include apertures 72.

Figure 5:
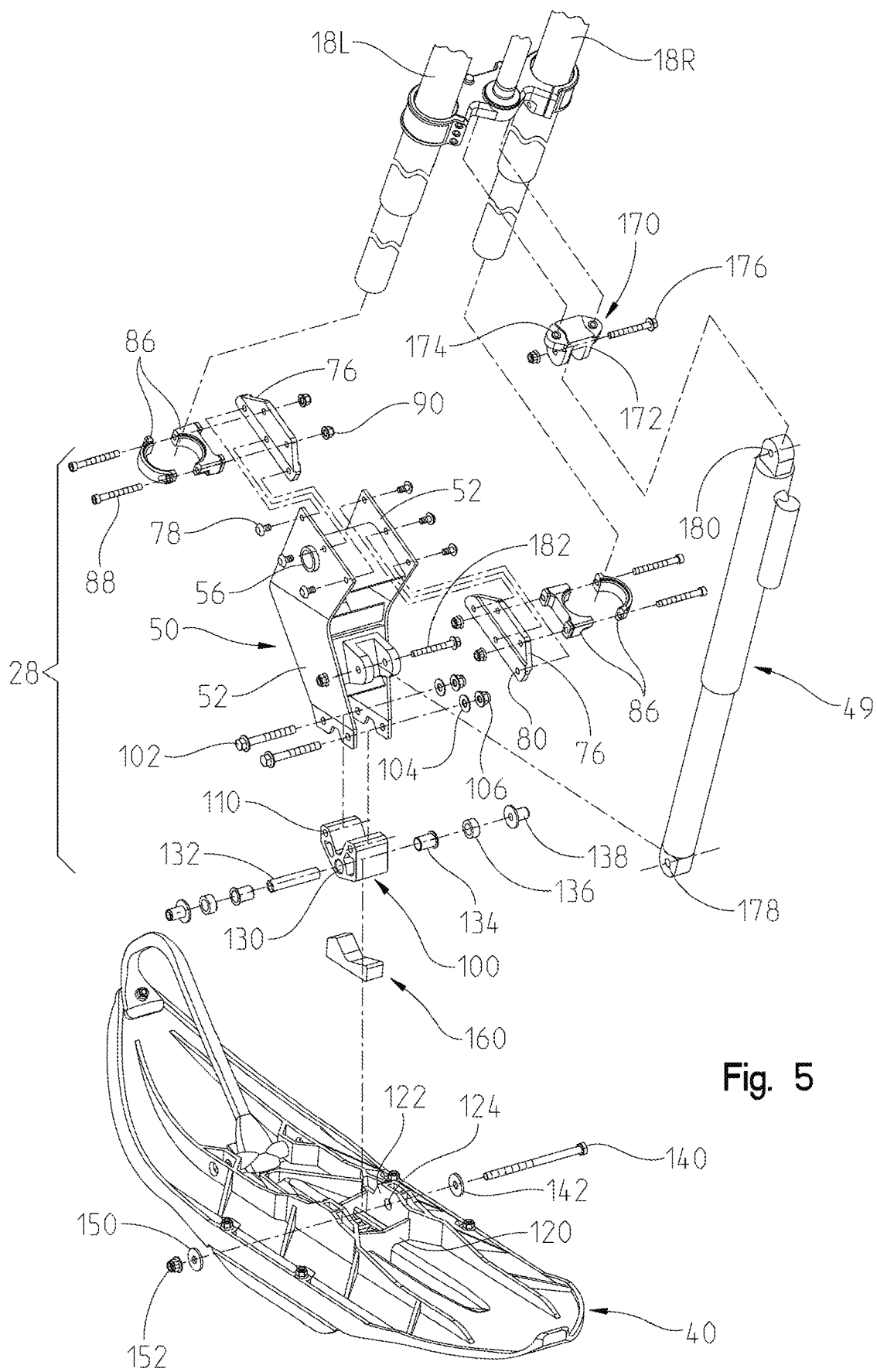
FIG. 5 is a perspective view similar to that of FIG. 3 showing the suspension in an exploded manner.
Figure 5A:
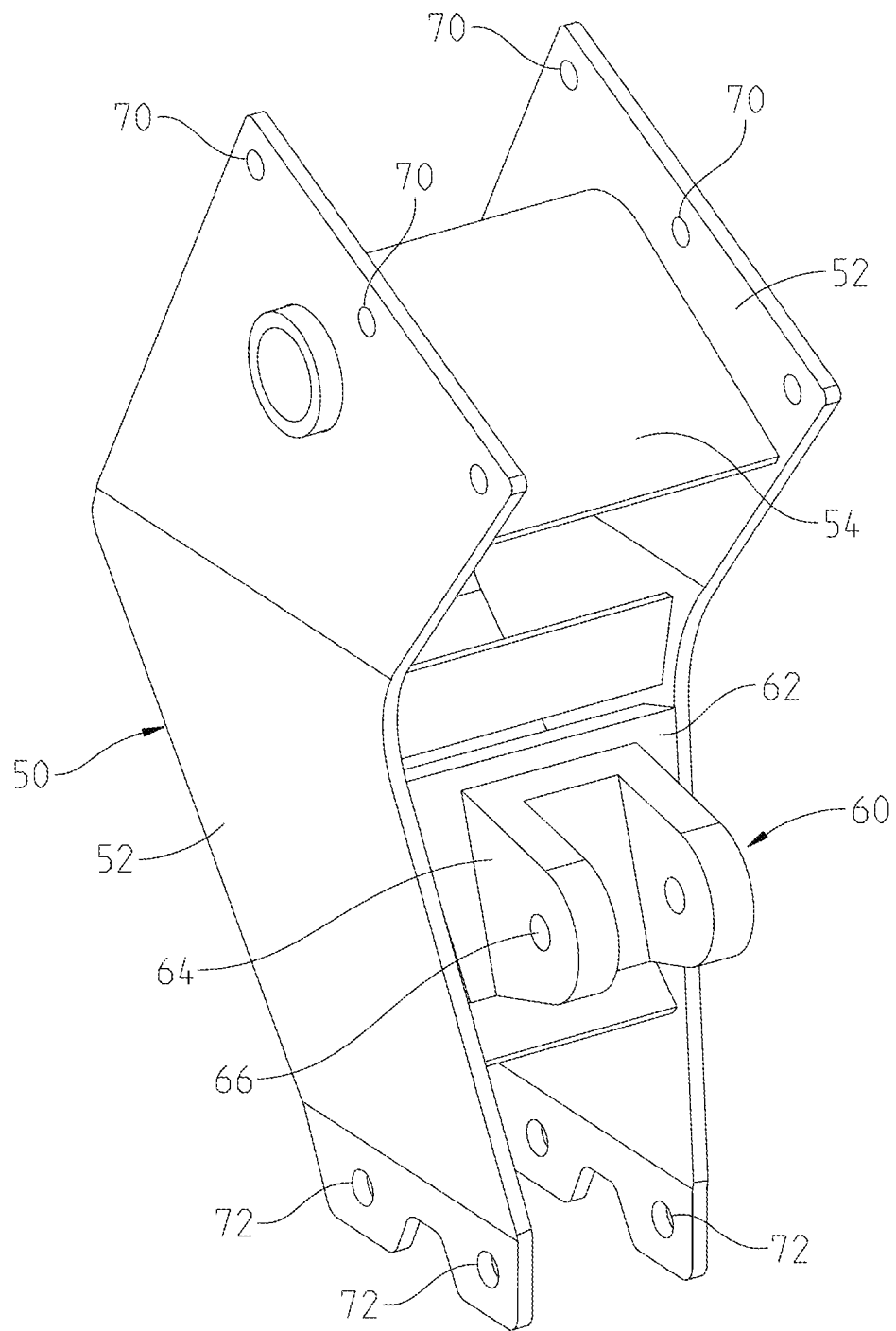
FIG. 5A is an enlarged view of the spindle portion of the ski mount shown in FIG. 5.

As shown in FIG. 5, brackets 76 are coupled to a top of the plates 52 by way of fasteners 78 extending through apertures 80 of bracket 76 and into threaded engagement with threaded apertures 70 (FIG. 5A). Brackets 76 retain clamps 86 by way of fasteners 88 and 90 which couple to ends of legs 18L and 18R as best shown in FIG. 2. Brackets 76 could be integrated with plate portions 52 which would extend from an upper edge of the plate portions 52.

Figure 6:
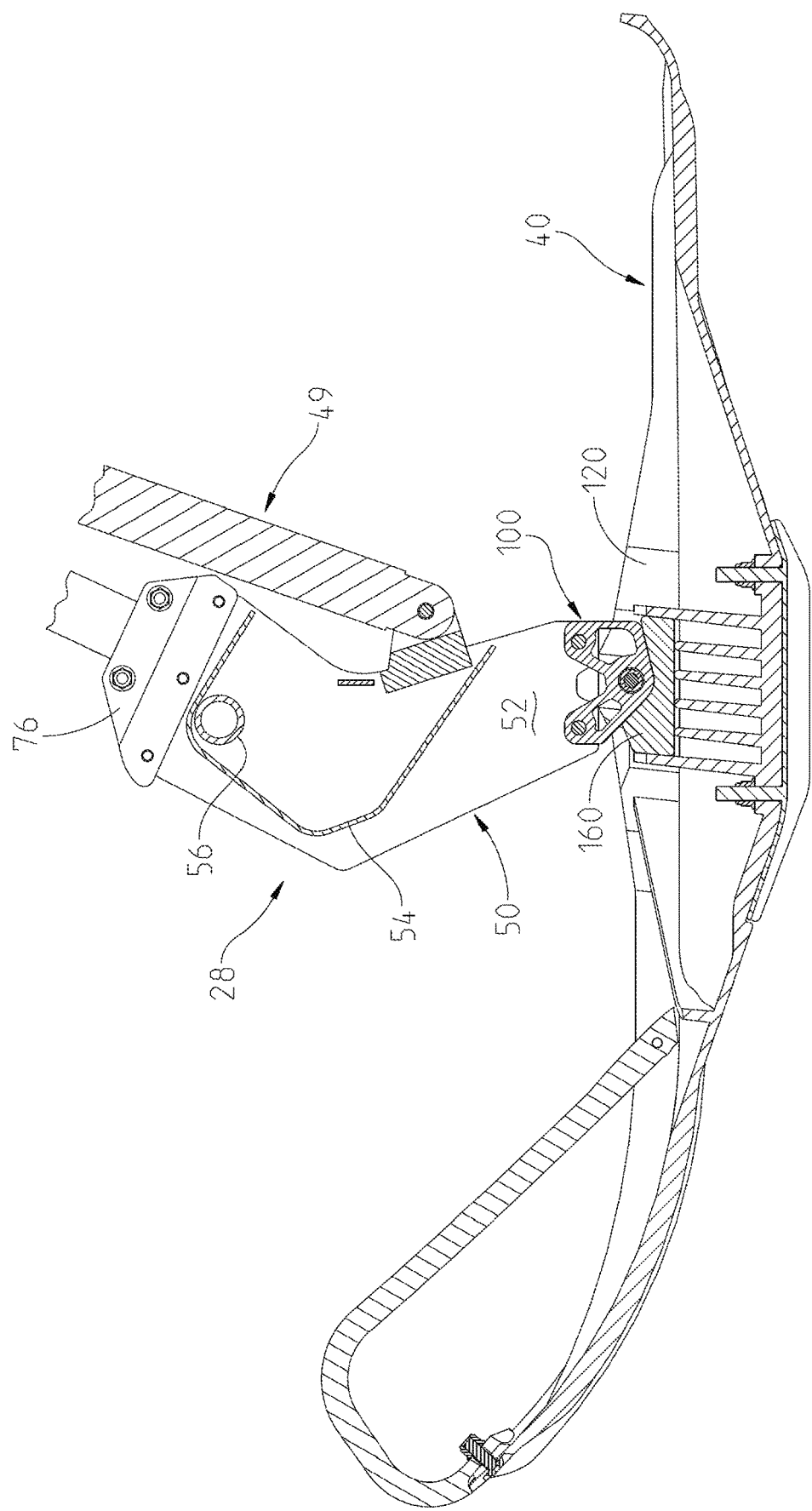
FIG. 6 is a cross-sectional view taken through lines 6-6 of FIG. 2.
Figure 7:
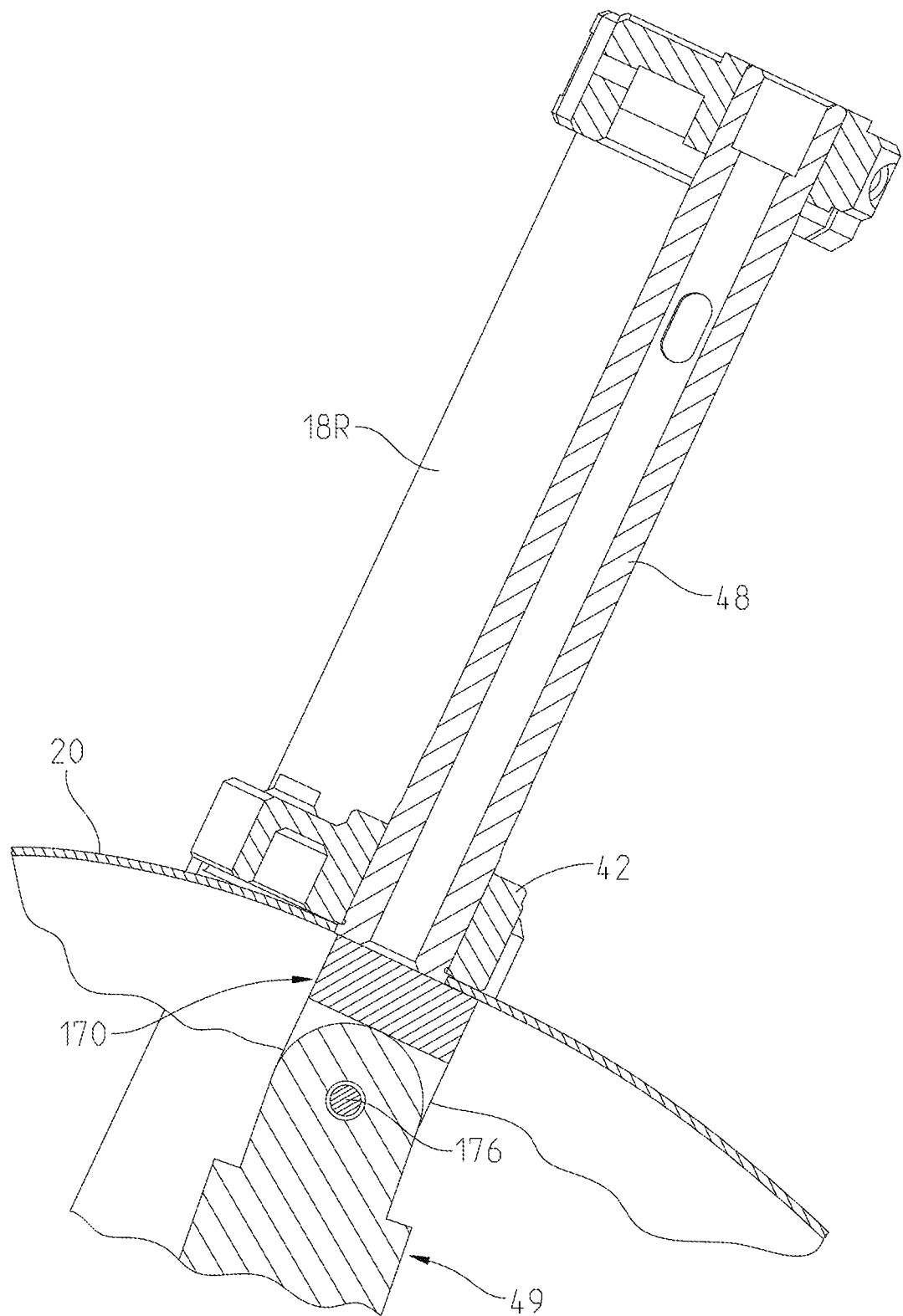
FIG. 7 is a cross-sectional view taken through lines 7-7 of FIG. 2.
Figure 8:
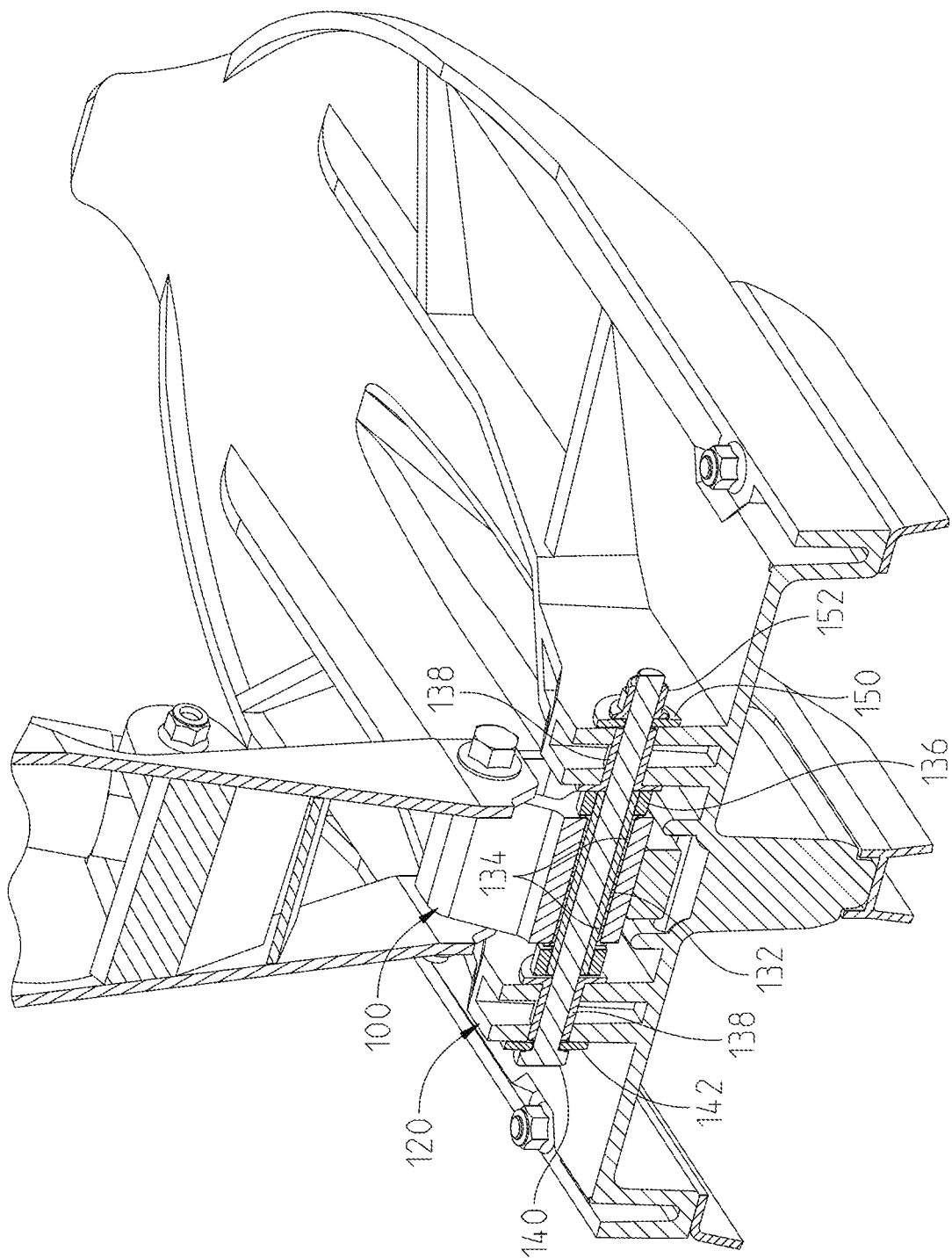
FIG. 8 is a cross-sectional view taken through lines 8-8 of FIG. 2.

A lower coupler 100 is coupled to apertures 72 (FIG. 5A) by way of fasteners 102, 104 and 106. Fasteners 102 extend through apertures 110 of coupler 100. Coupler 100 is also coupled to ski 40 and in particular, to a mount portion 120 of ski 40 where ski mount 120 includes up standing walls 122 having apertures 124. Coupler 100 includes an aperture at 130 which receives a sleeve 132 which thereupon receives bushings 134, thereover. As shown best in FIG. 8, bushings 134 overlap sleeve 132 and sleeves 138 extend into aperture 124 (FIG. 5 of ski mount 120). Spacers 136 extend between heads of the bushings 134, 138. Fastener 140 is received through washer 142 through aperture 124 and through a combination of bushings 138, 136, 134 and sleeve 130 to receive fasteners 150 and 152. Fasteners 140, 150 and 152 couple the ski 40 to the coupler 100. A rubber mount 160 is positioned in the ski mount 120 and conforms to, but allows movement between, coupler 100 and ski 40 as best shown in FIG. 6.

Finally, as shown in FIG. 5, suspension 15 includes bracket 170 having a clevis 172. Bracket 170 is mounted to a bottom of the triple clamp 42 through apertures 174. As shown best in FIG. 7, bracket 170 traps fender 20 between triple clamp 42 and bracket 170. Thus, as shown in FIG. 5, linear force element 49 is coupled to the snow bike 2 by way of fastener 176 extending through aperture 180 of linear force element 49 and through clevis 172; and by way of fastener 182 extending through aperture 178 of linear force element 49 and through clevis 64 (FIG. 5A). Thus, linear force element 49 supplements the existing shocks in the front legs 18L and 18R.

Figure 9:
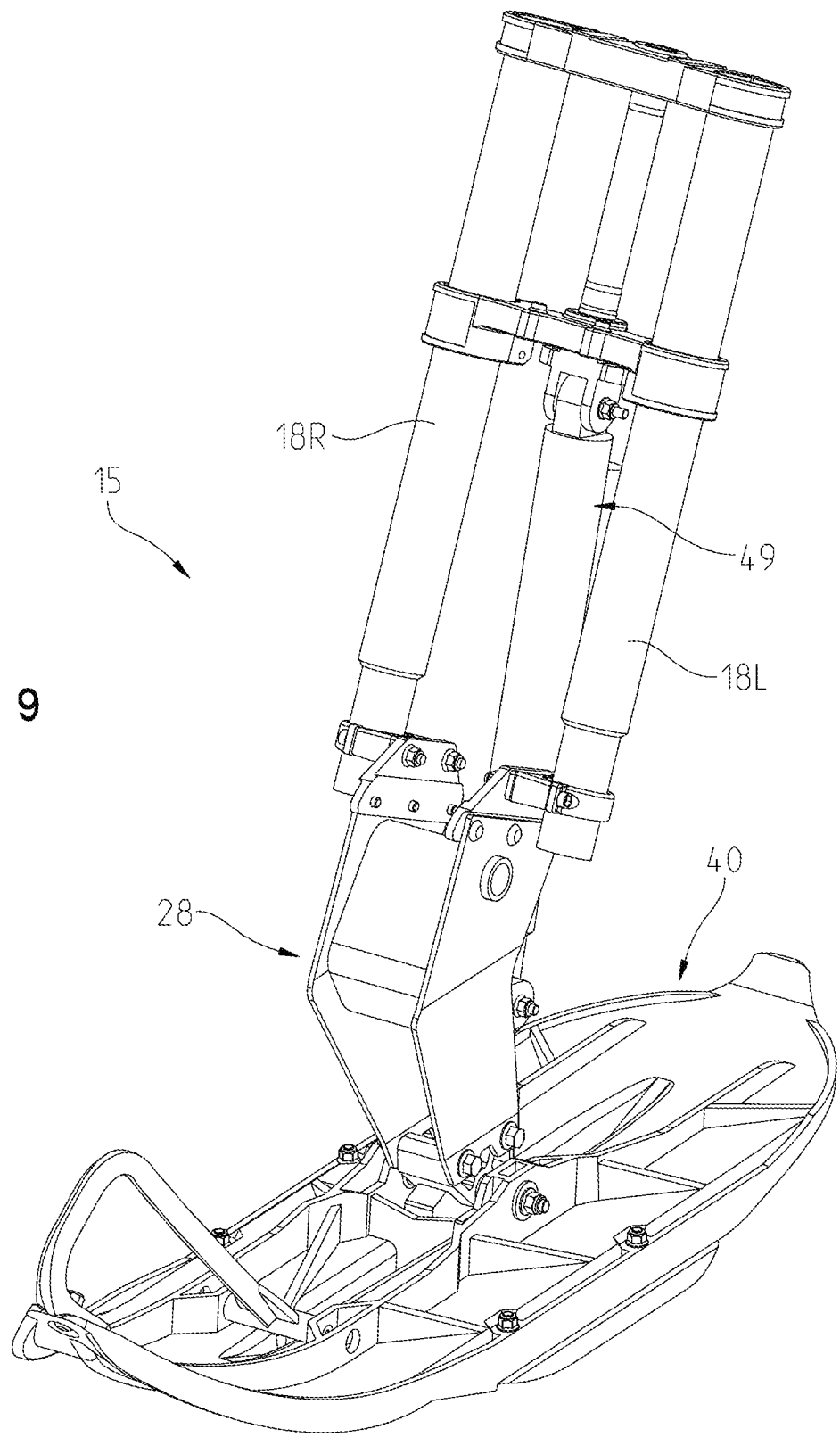
FIG. 9 is a view similar to that of FIG. 2 showing the suspension in a fully compressed configuration.
Figure 10:
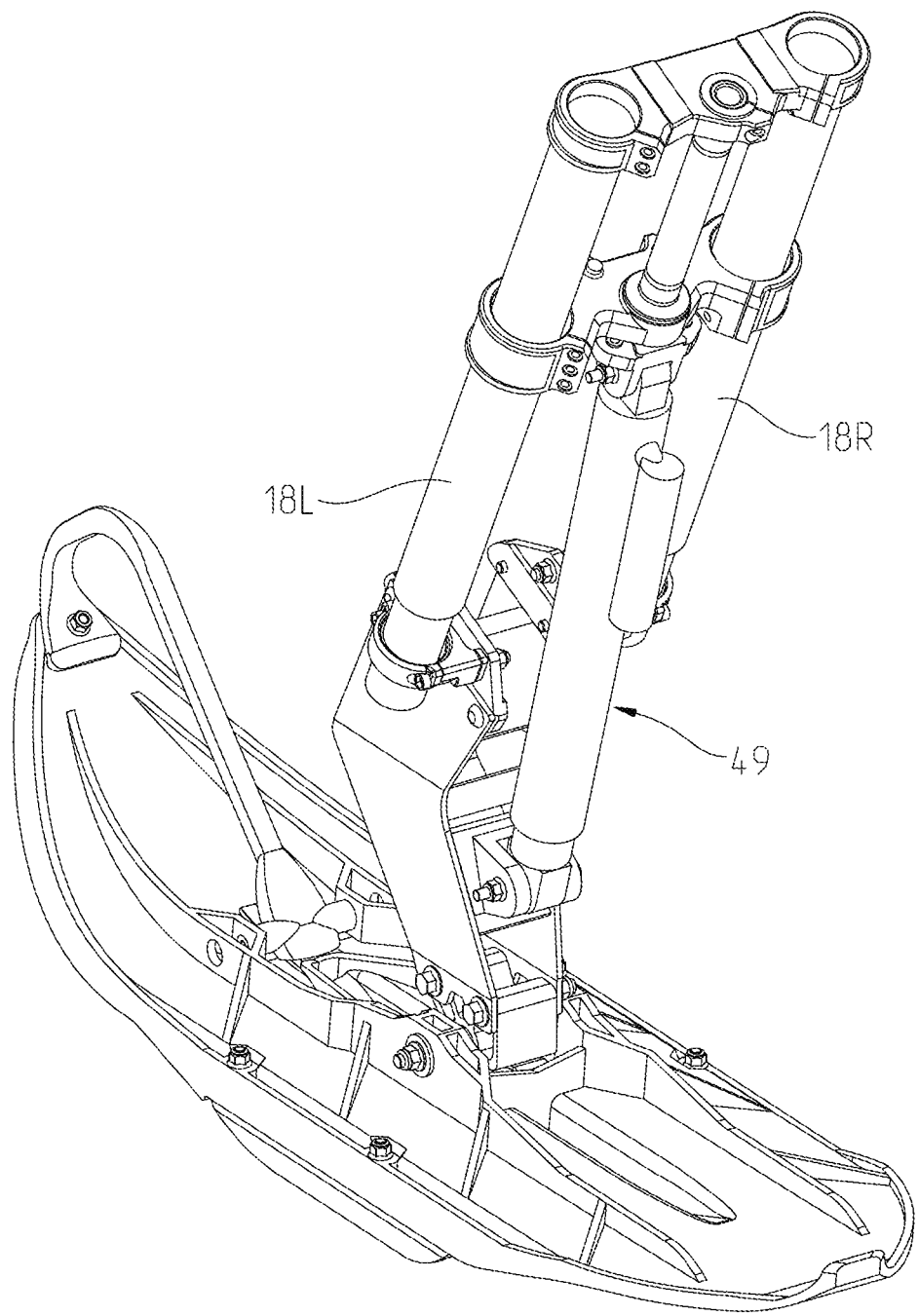
FIG. 10 is a view similar to that of FIG. 3 shown in a fully compressed condition.
Figure 11:
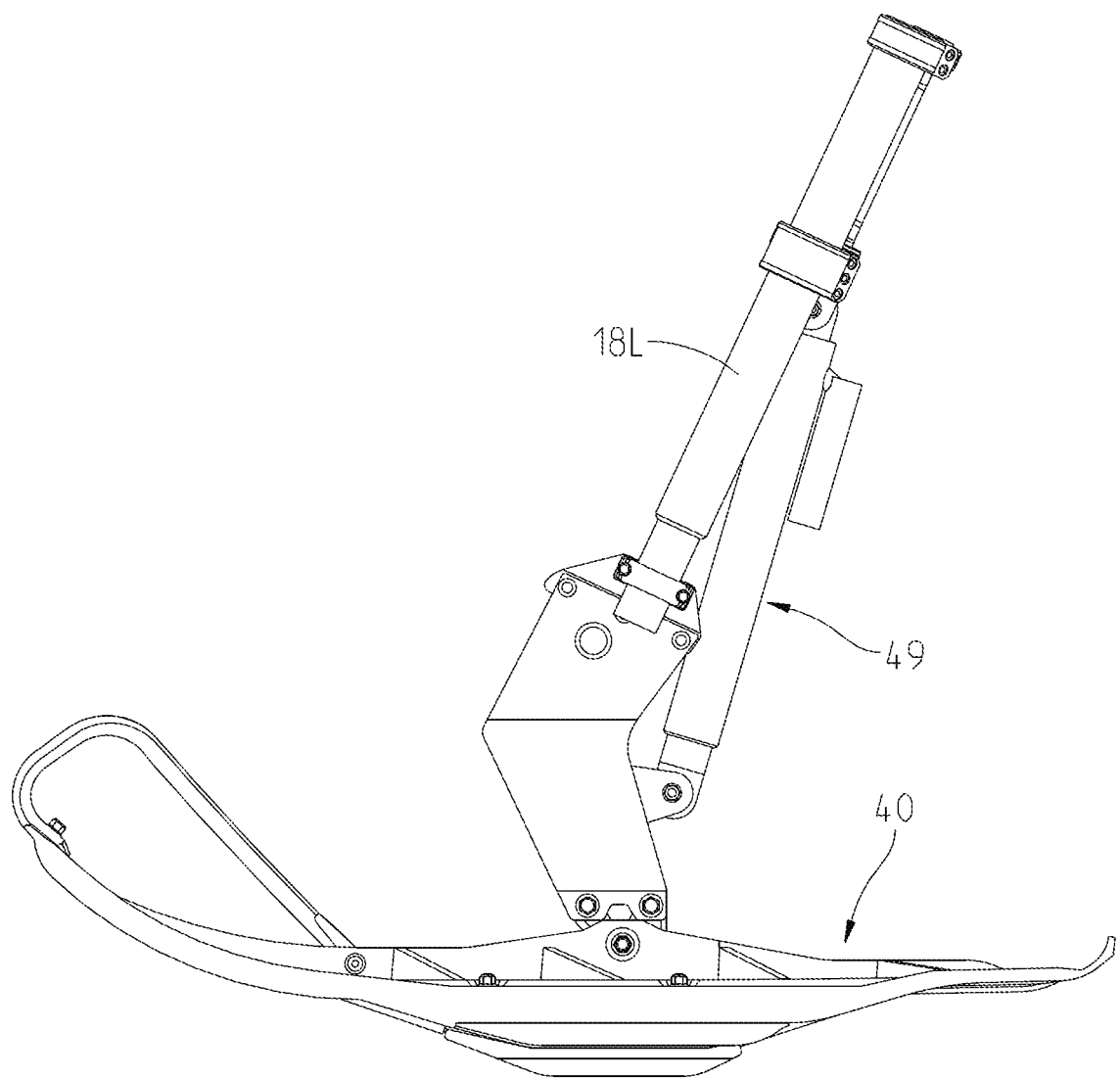
FIG. 11 is a view similar to that of FIG. 4 shown in suspension in a fully compressed condition.

With reference now to FIGS. 9-11, the operation of the front suspension 15 will now be described in greater detail. As shown, suspension 15 is shown in the fully collapsed state where both the shock absorbers of the front forks 18L, 18R and linear force element 49 are shown in a fully compressed state. As shown, linear force element 49 is an air shock available from Fox Shox and has the same linear travel as the motor bike forks 18L, 18R; a range of 8 to 14", preferably 10 to 12". In the embodiment shown the linear travel is 11". In the embodiment shown, linear force element 49 is an EVOL Series Float shock available from Fox Shox located at 915 Disc Dr., Scotts Valley, Calif. 95066. This shock is an air shock with a progressive rate which progressive range is adjustable.

While the LFE 49 is shown herein as an air shock, other linear force elements are possible. For example, the linear force element could be a gas shock or a shock with a spring over, similar to that described in our U.S. Pat. No. 8,079,602. The linear force element could also be a hydraulic shock, or a spring or a series of springs. These components could have a linear or progressive rate which rate is adjustable. In addition, linear force element could be a linkage coupled between the triple clamp and the ski, a linkage similar to that described in our US Patent as the coupled suspension system. In that way, the stroke of the shock could be tuned to vary from the stroke of the front forks 18L and 18R.

Linear force element 49 works in combination with the motor bike shocks within forks 18L, 18R to give the front forks the proper spring rate and damping force for the snow bike. In the embodiment shown, linear force element 49 is also in compression the entire time; that is between the positions shown in 2-4 and 9-11.

It should be appreciated that the spindle 50 could be comprised of an integrated unit where the all of the components are fixed to each other, namely spindle 50, brackets 76, the inner portions of brackets 86 and coupler 100. This could be assembled by such means as welding or adhesives for example. The integrated spindle could also be a forging or casting which is in a homogenous state.

Figure 12:
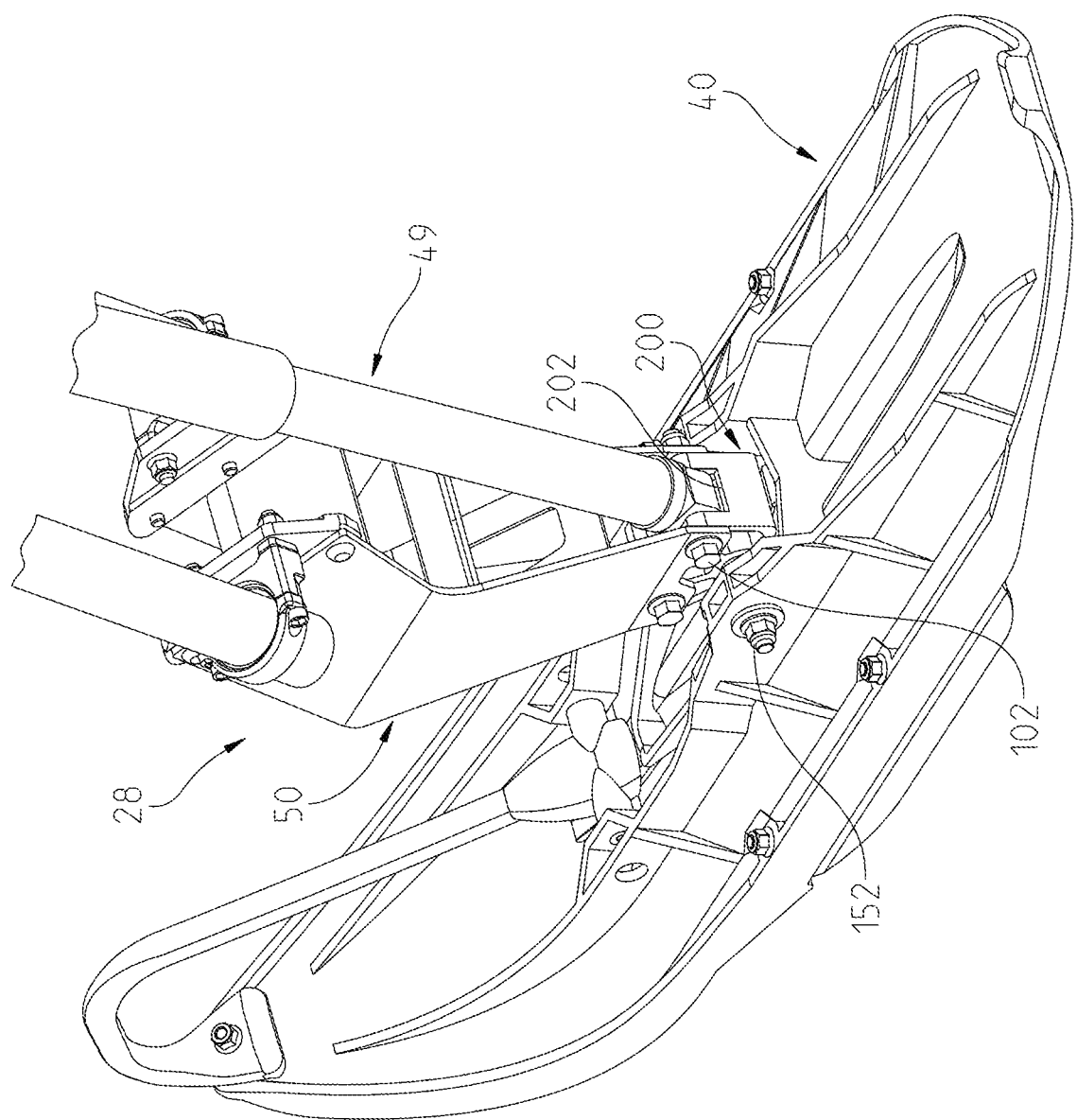
FIG. 12 is a view similar to that of FIG. 3 showing an alternate lower shock mounting.

It should also be appreciated that a lower end of the LFE 49 could be attached to a modified coupler 100. As shown in FIG. 12, a coupler 200 is shown at 200, which is identical to coupler 100, yet it includes a notch at 202 to receive a lower end of LFE 49. In this manner, fastener 102 couples both the coupler 200 and the LFE 49, as fastener 102 extends through aperture 178 (FIG. 5) of LFE 49.

In the above described embodiment, the ski mounts 28 and linear force element 49 are designed as a kit for converting a motorbike to a snow bike having existing shocks positioned in the front forks, or for retrofitting existing snow bikes. In the case where a new snow bike front suspension is desired, the front suspension could include front forks 18L and 18R, but in this case, the front forks would not include internal shocks, but rather would only be struts which allow linear telescopic movement but would not have any internal dampening resistance. While this design would include a linear force element 49, the spring rate of the combined suspension 15 would still be consistent with that disclosed above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:
1. A front fork assembly of a snow bike, comprising:
   a left leg having an upper leg portion and a lower leg portion;
   a right leg having an upper leg portion and a lower leg portion;
   a ski mount having a lower end for coupling to a ski and an upper end for coupling to the left and right leg; and a linear force element having a first end positioned adjacent and coupled to the left and right legs and a second end coupled to the lower end of the ski mount.

2. A front suspension assembly for a snow bike, comprising:
a first arm configured to couple with a frame member of the snow bike;
a second arm generally opposite the first arm;
a ski mount configured to couple with a front ski and configured with a first mounting location for the first arm, a second mounting location for the second arm, a third mounting location for the front ski, and a fourth mounting location; and
a linear force element having an upper end and a lower end, and the lower end is coupled to the ski mount at the fourth mounting location, and a portion of the linear force element is laterally aligned with a portion of the first arm and a portion of the second arm.

3. The front suspension assembly of claim 2, wherein the third mounting location is longitudinally intermediate the first mounting location and the fourth mounting location.

4. The front suspension assembly of claim 2, wherein the fourth mounting location is at a vertical height below the first and second mounting locations.

5. The front suspension assembly of claim 2, wherein and the fourth mounting location is positioned longitudinally rearward of the first, second, and third mounting locations, and the third mounting location being longitudinally offset from the first and second mounting locations.

6. The front suspension assembly of claim 2, wherein the first and second arms are coupled to an upper portion of the ski mount.

7. The front suspension assembly of claim 6, wherein the linear force element is coupled to a lower portion of the ski mount.

8. The front suspension assembly of claim 7, wherein the linear force element is coupled to a lower extent of the ski mount.

9. A snow bike, comprising:
a frame assembly;
a propulsion assembly supported by the frame assembly;
a steering assembly supported by the frame assembly and including an upstanding first member and an upstanding second member;
a ski mount operably coupled to the first and second members at a first position and including a bracket;
a ski operably coupled to the bracket of the ski mount; and
a linear force element having a first end and a second end, the second end operably coupled to the bracket of the ski mount, and the first end positioned above the second end and above the first position wherein at least a portion of the linear force element extends above a lower end of each of the upstanding first member and the upstanding second member.

10. The snow bike of claim 9, wherein the bracket includes a first mounting location configured to couple with the ski and a second mounting location configured to couple with the linear force element.

11. The snow bike of claim 10, wherein the first mounting location is longitudinally offset from the second mounting location.

12. The snow bike of claim 11, wherein the first mounting location is longitudinally forward of the second mounting location.

13. The snow bike of claim 9, wherein in the bracket includes a first mounting location configured to couple with the ski and a second mounting location configured to couple with the linear force element and the ski mount.

14. The snow bike of claim 13, wherein the second mounting location is vertically offset from the first mounting location.

15. The snow bike of claim 14, wherein the second mounting location is vertically above the first mounting location.

16. The snow bike of claim 9, wherein upper ends of the first and second members are vertically aligned with a rearward end of the ski.

17. The snow bike of claim 9, wherein the bracket is positioned within a vertical envelope of the ski.

18. A front suspension assembly for a snow bike, comprising:
a first arm having an upper end and a lower end, and the upper end is configured to couple with a portion of the snow bike;
a second arm having an upper end and a lower end, and the upper end is configured to couple with the portion of the snow bike;
a ski mount having a first mounting location for coupling with the first arm and a second mounting location for coupling with the second arm; and
a linear force element having an upper end and a lower end, the lower end being forward of the upper end and the lower end is configured to couple with the ski mount at a third mounting location having a vertical position lower than the first and second mounting locations and a lateral position between the first and second mounting locations.

19. The front suspension assembly of claim 18, wherein the ski mount includes a fourth mounting location for coupling with a front ski of the snow bike, and the lower ends of the first and second arms are configured to be coupled to the ski mount at the respective first and second mounting locations, and the third mounting location is longitudinally rearward of the first and second mounting locations.

20. The front suspension assembly of claim 19, wherein the third mounting location is directly adjacent the fourth mounting location.

21. The front suspension assembly of claim 18, wherein the upper end of the linear force element is at a height vertically intermediate a height of the upper end of the first arm and a height of the lower end of the first arm.

22. The front suspension assembly of claim 18, wherein a vertical length of the linear force element is greater than a vertical length of the first arm.

23. The front suspension assembly of claim 18, wherein the ski mount is generally comprised of an upper portion defining approximately a first half of a vertical length of the ski mount and a lower portion defining approximately a second half of the vertical length of the ski mount, a horizontal centerline of the ski mount is defined between the upper portion and the lower portion, and the lower end of the linear force element is positioned lower than the horizontal centerline of the ski mount.

24. The front suspension assembly of claim 18, wherein a vertical length of the first arm is defined as the distance between the upper and lower ends of the first arm, and a vertical length of the ski mount is defined as the distance between an upper end of the ski mount and a lower end of the ski mount, and the vertical length of the ski mount is greater than half of the vertical length of the first arm.

25. The front suspension assembly of claim 24, wherein a vertical length of the linear force element is defined as the distance between the upper and lower ends of the linear force element, and the vertical length of the ski mount is approximately equal to half of the vertical length of the linear force element.

26. The front suspension assembly of claim 18, wherein the lateral position of the third mounting location is between innermost points of the first and second mounting locations.

\* \* \* \* \*